UNITED STATES PATENT OFFICE.

GUSTAVUS J. ESSELEN, JR., OF SWAMPSCOTT, MASSACHUSETTS, ASSIGNOR, BY MESNE ASSIGNMENTS, TO D. & L. SLADE COMPANY, OF BOSTON, MASSACHUSETTS.

FLAVORING AND PERFUMERY EXTRACT.

1,378,099.      Specification of Letters Patent.      Patented May 17, 1921.

No Drawing.      Application filed June 5, 1920. Serial No. 386,779.

*To all whom it may concern:*

Be it known that I, GUSTAVUS J. ESSELEN, Jr., a citizen of the United States, residing at Swampscott, in the county of Essex and State of Massachusetts, have invented certain new and useful Improvements in Flavoring and Perfumery Extracts; and I do hereby declare the following to be a full, clear, and exact description of the invention, such as will enable others skilled in the art to which it appertains to make and use the same.

The present invention relates to flavoring and perfumery extracts.

It is customary in extracts of this character to employ an alcoholic base which in the case of the flavoring extracts must necessarily be of a potable character. This alcoholic base serves to maintain the essential oils comprising the extract in a permanent solution. For various reasons which will be obvious to those skilled in the art, it is desirable to employ in these extracts some other form of base which will be free from the disadvantages of an extract containing a high percentage of potable alcohol.

To this end the object of the present invention is the production of an extract having all of the advantages residing in an alcoholic extract but free from the disadvantages attendant upon the use of such an extract. With this object in view, it has been discovered that a mixture of certain of the esters of glycerin and acetic acid will dissolve and permanently maintain in solution the necessary concentration of certain essential and terpeneless oils such as are used in flavoring and perfumery extracts. A solution of this character mixes readily with water and is without injurious effect upon the human system. The base which has been actually produced for solvent purposes is a mixture of mono- and diacetins, a colorless liquid which, when properly purified, is substantially free from taste. It will be evident that an extract thus formed is particularly suited for flavoring purposes and in fact for all purposes where a permanent solution of an oil of this character is desired.

In actual practice, the essential oils of lemon, orange, bitter almond, peppermint and others, are dissolved and permanently maintained in solution in the mixture of mono- and diacetins. The proportion by volume of the essential oil in these solutions ranges from one to five per cent., according to the character of the oil. As is sometimes desirable in the case of lemon extract, a greater concentration of a terpeneless lemon oil may be employed which is readily soluble in the base up to any desired concentration.

The solvent mixes with water in almost all proportions and a small quantity of the extract added to water does not produce any greater turbidity than would a corresponding amount of alcoholic extract.

The base may be prepared by one of several methods, but it is preferred to employ the following new method which forms the subject-matter of applicant's copending application Serial No. 397,960, filed July 21, 1920: A mixture of 18 pounds of glycerin, 108 pounds of glacial acetic acid (99%) and 0.18 pound of sulfuric acid 66° Bé. are heated for about one and one-half hours at a temperature of 100 to 110° C. About one pound of crystallized sodium acetate is then added to neutralize the sulfuric acid which is present. This mixture is allowed to stand for approximately one hour, being subjected to agitation at intervals during this period, after which it is filtered and the filtrate distilled at atmospheric pressure and the distillate collected up to a temperature of 140° C., approximately. The distillate collected up to this point is practically pure acetic acid of about 87% strength. After the collection of the acetic acid has been completed, reduced pressure is then applied to the still and substantially all of the distillate coming over is a mixture of mono- and diacetins which is a substantially colorless liquid admirably adapted to form a solvent base for essential oils. If it is found that this product possesses a slightly bitter flavor it may be purified by the use of bone black. This base is then mixed with the proper percentage of essential or terpeneless oil or a mixture of both and the resulting product is a permanent solution which mixes with water and is suitable in every way for use as a flavoring extract or perfumery extract.

What is claimed is:

1. A solution consisting of an essential oil or the like dissolved in an ester of glycerin and acetic acid.

2. A solution consisting of an oil such as used in flavoring or perfumery extracts dissolved in a mixture of acetic acid esters of glycerin.

3. A solution consisting of an essential oil dissolved in a mixture of mono- and diacetins and having a concentration by volume of five per cent. or less.

4. A solution consisting of an oil such as used in flavoring and perfumery extracts dissolved in a mixture of mono- and diacetins.

5. A solution consisting of a terpeneless oil dissolved in a mixture of mono- and diacetins.

GUSTAVUS J. ESSELEN, Jr.